United States Patent
Nebendahl (10) Patent No.: US 10,389,450 B2
(45) Date of Patent: Aug. 20, 2019

(54) OPTICAL BANDWIDTH INTERLEAVING

(71) Applicant: Keysight Technologies, Inc., Santa Ana, CA (US)

(72) Inventor: Bernd Nebendahl, Leonberg (DE)

(73) Assignee: Keysight Technologies, Inc., Santa Rosa, CA (US)

(*) Notice: Subject to any disclaimer, the term of this patent is extended or adjusted under 35 U.S.C. 154(b) by 507 days.

(21) Appl. No.: 14/015,121

(22) Filed: Aug. 30, 2013

(65) Prior Publication Data

US 2015/0063378 A1 Mar. 5, 2015

(51) Int. Cl.
*H04B 10/61* (2013.01)

(52) U.S. Cl.
CPC .................. *H04B 10/614* (2013.01)

(58) Field of Classification Search
CPC . H04B 10/2575; H04B 10/516; H04B 10/614
See application file for complete search history.

(56) References Cited

U.S. PATENT DOCUMENTS

| | | | |
|---|---|---|---|
| 8,180,227 B2 | 5/2012 | Liu et al. | |
| 8,463,142 B2 | 6/2013 | Zhao et al. | |
| 8,768,173 B2 | 7/2014 | Tanimura et al. | |
| 2009/0067843 A1* | 3/2009 | Way | H04B 10/506 398/79 |
| 2010/0178057 A1 | 7/2010 | Shieh | |
| 2012/0177383 A1* | 7/2012 | Tanimura | H04B 10/61 398/158 |
| 2013/0107341 A1 | 5/2013 | Zeng et al. | |
| 2013/0216239 A1* | 8/2013 | Zhang | H04B 10/613 398/202 |

FOREIGN PATENT DOCUMENTS

| | | |
|---|---|---|
| JP | 2011-186303 A | 9/2011 |
| JP | 2012-147064 A | 8/2012 |
| JP | 2012151752 A | 8/2012 |
| JP | 2013505676 A | 2/2013 |
| WO | WO2007135407 A1 | 11/2007 |

OTHER PUBLICATIONS

Nebendahl, et al., "Metrology of Advanced Optical Modulation Formats", Agilent White Paper, Agilent Technologes, Inc.
Szafraniec, et al. "Technical Paper for Kalman Filter Based Modulation Analysis", Agilent Technologes, Inc.
Nebendahl, et al., "Metrology of Advanced Optical Modulation Formats," Agilent Technologies, Inc., 5990-3748EN, (2009).

(Continued)

*Primary Examiner* — Mina M Shalaby (57) ABSTRACT

A method of processing an optical input signal comprises transmitting the optical input signal through first and second signal paths, mixing the optical input signal with first and second local oscillator (LO) signals in the respective first and second signal paths to produce first and second electrical signals corresponding to different portions of a frequency spectrum of the optical input signal, and combining the first and second electrical signals to produce a coherent time-domain output signal.

11 Claims, 8 Drawing Sheets

(56) References Cited

OTHER PUBLICATIONS

Essiambre, et al., "Capacity limits of optical fiber networks," Journal of Lightwave Technology vol. 28, No. 4, Feb. 15, 2010, p. 662-701.

Marshall, et al. "Kalman filter carrier and polarization-state tracking," Optics Letters vol. 35, No. 13, Jul. 1, 2010, p. 2203-2205.

Szafraniec, et al. "Polarization demultiplexing in Stokes space," Optics Express vol. 18, No. 7, Aug. 16, 2010, p. 17928-17939.

Szafraniec, et al. "Kalman Filter Based Estimation and Demodulation of Complex Signals," Agilent Technologies, Inc., 5990-6409EN.

Schmogrow, et al. "Error Vector Magnitude as a Performance Measure for Advanced Modulation Formats," IEEE Photonics Technology Letters vol. 24, No. 1, Jan. 2012, p. 61-63.

Szafraniec, et al., "Performance Monitoring and Measurement Techniques for Coherent Optical Systems," Journal of Lightwave Technology vol. 31, No. 4, Feb. 15, 2013, p. 648-663.

Pfau, et al., "Optimization of 16-ary Quadrature Amplitude Modulation Constellations for Phase Noise Impaired Channels", ECOC Technical Digest 2011, OSA.

Hillerkuss, et al., "26 Tbit/s line-rate super-channel transmission utilizing all-optical fast Fourier transform processing," Nature Photonics, May 22, 2011.

Nebendahl, et al. "Quality Metrics in Optical Modulation Analysis: EVM and its relation to Q-factor, OSNR, and BER," Proceeding, ACP 2012, Guangzhou, China.

"Quality Measures for Complex Modulated Signals Reaching for Standardization," Agilent Technologies, Inc., 5991-1691EN.

Japanese Office Action dated Sep. 7, 2018 with translation, 11 pgs.

Japanese Notice of Allowance dated Apr. 16, 2019, 3 pgs.

English translation of Japanese Notice of Allowance dated Apr. 16, 2019, 3 pgs.

\* cited by examiner

OPTICAL BANDWIDTH INTERLEAVING

BACKGROUND

Optical communication systems encode digital information onto an optical carrier signal by modulating various signal characteristics. A simple form of encoding, for instance, modulates the amplitude of the optical carrier signal by switching it between an on state and an off state. An example of this simple form of encoding is on-off keying (OOK). More advanced forms of encoding may modulate other signal characteristics in addition to amplitude, such as phase, and polarization. Examples of these more advanced forms of encoding include binary phase-shift keying (BPSK), which encodes digital information using two symbols, and quadrature phase-shift keying (QPSK), which encodes digital information using four symbols.

In an optical communication system using advanced encoding, a receiver typically decodes the optical carrier signal using a combination of one or more couplers, phase-shifters or delay lines, photodetectors (PDs), and analog to digital converters (ADCs). For instance, the receiver may use an optical phase-quadrature (IQ) hybrid in combination with balanced or unbalanced photodiodes to down-convert the optical carrier signal to an electrical baseband frequency range, and it may use a pair of ADCs to digitize the resulting electrical signals for subsequent processing.

To measure and subsequently decode optical signals that have been encoded at a relatively high rate, it is generally necessary to use ADCs, PDs, and other components that have commensurately high bandwidth. Unfortunately, however, available ADCs, PDs, and other components, may be too slow or too expensive to perform decoding at the relatively high rates required by some optical communication systems. For instance, even though the channel bandwidth of an optical communication system may be only a small fraction of the carrier frequency, it may nevertheless reach several tens of gigahertz (GHz), which can challenge the bandwidth of even the fastest and most expensive ADCs and PDs on the market.

In view of these and other shortcomings of conventional optical measurement or communication systems, there is a general need for new approaches to optical measurement and decoding that overcome the restrictions imposed by existing component technologies.

SUMMARY

In a representative embodiment, a method of processing an optical input signal comprises transmitting the optical input signal through first and second signal paths, mixing the optical input signal with first and second local oscillator (LO) signals in the respective first and second signal paths to produce first and second electrical signals corresponding to different portions of a frequency spectrum of the optical input signal, and combining the first and second electrical signals to produce a coherent time-domain output signal. The optical input signal may be generated, for instance, using amplitude and phase modulation.

In certain embodiments, the method further comprises splitting the optical input signal into first and second polarization components, transmitting the first polarization component through the first and second signal paths, transmitting the second polarization component through third and fourth signal paths, mixing the second polarization component with the first and second LO signals in the respective third and fourth and second signal paths to produce third and fourth electrical signals corresponding to different portions of the frequency spectrum of the optical input signal, combining the first and second electrical signals to produce a coherent time-domain output signal for the first polarization and combining the third and fourth electrical signals to produce a coherent time-domain output signal for the second polarization.

In certain embodiments, the method further comprises generating the first and second LO signals by generating an LO precursor signal having a carrier frequency, and modulating the LO precursor signal to generate at least two sidebands, de-multiplexing the modulated LO precursor signal to generate the first and second LO signals. The LO precursor signal may be generated by an external cavity diode laser (ECL), for example. The carrier frequency may or may not be suppressed by the modulation. De-multiplexing the modulated LO precursor signal may be performed by a wavelength division multiplexer (WDM). Modulating the LO precursor signal may be performed by a Mach-Zehnder Modulator (MZM), and it may be performed under control of a clock signal, with the first and second electrical signals being digitized in synchronization with the clock signal. Moreover, the method may further comprise measuring the clock signal using an analog to digital converter and determining a phase relationship between the first and second LO signals based on the measurement.

In certain embodiments, the method further comprises generating the first and second LO signals by operating two lasers, or alternatively, generating the first and second LO signals by operating three lasers to generate respective first through third optical signals having respective first through third carrier frequencies, and outputting portions of the first and third optical signals as the first and second LO signals. The method may still further comprise generating a first beat frequency corresponding to a difference between the first and second carrier frequencies, generating a second beat frequency corresponding to a difference between the second and third carrier frequencies, and determining a phase difference between the first and second LO signals based on the first and second beat frequencies.

In certain embodiments, the method further comprises, prior to combining the first and second electrical signals, processing each of the first and second electrical signals by a plurality of balanced or unbalanced photodetectors and analog to digital converters. In certain embodiments, the method further comprises, prior to mixing the optical input signal with the first and second LO signals, combining the optical input signal with the first and second LO signals using a plurality of optical IQ hybrids.

In another representative embodiment, a system configured to process an optical input signal comprises first and second signal paths configured to receive the optical input signal, first and second IQ hybrids disposed in the respective first and second signal paths and configured to combine the optical input signal with respective first and second LO signals to produce first and second signals, first and second photodetectors configured to convert the first and second signals into corresponding first and second down-converted electrical signals corresponding to different portions of a frequency spectrum of the optical input signal, respectively, a plurality of analog to digital converters configured to digitize the first and second down-converted electrical signals, and a stitching unit configured to combine the first and second digitized electrical signals to produce a coherent time-domain output signal.

In certain embodiments, the method further comprises third and fourth signal paths, a polarization beam splitting unit configured to split the optical input signal into first and second polarization components, to transmit the first polarization component through the first and second signal paths, and to transmit the second polarization component through the third and fourth signal paths, wherein the first polarization component is combined with the first and second LO signals in the first and second IQ hybrids to produce the first and second signals, and wherein the coherent time-domain output signal corresponds to the first polarization component, third and fourth IQ hybrids disposed in the respective third and fourth signal paths and configured to combine the second polarization component with respective first and second LO signals to produce third and fourth signals, third and fourth PDs configured to convert the third and fourth signals into corresponding third and fourth down-converted electrical signals corresponding to different portions of the frequency spectrum of the optical input signal, respectively, an additional plurality of analog to digital converters configured to digitize the third and fourth down-converted electrical signals, and an additional stitching unit configured to combine the third and fourth digitized electrical signals to produce an additional coherent time-domain output signal corresponding to the second polarization component.

BRIEF DESCRIPTION OF THE DRAWINGS

The described embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' mean to within acceptable limits or degree.

As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

The described embodiments relate generally to systems and methods configured to process optical signals in the context of optical communication or optical metrology. In certain embodiments, an optical carrier signal is down-converted to multiple different baseband signals using different coherent LO signals that are appropriately spaced apart using either balanced or unbalanced PDs. The baseband signals are then digitized using separate ADCs, and the resulting signals are then combined to form a single coherent baseband signal corresponding to the optical signal.

To allow proper reconstruction of the single coherent baseband signal, the LO signals are generally designed to have a discernible phase relationship. This can be accomplished using any of various alternative approaches. For instance, a first approach generates an LO precursor signal using a narrow line width laser (e.g., an external cavity diode laser (ECL)), and then it modulates the LO precursor signal such that its original center frequency is suppressed and two sidebands are generated. This is typically accomplished by a modulator controlled by a clock signal, such as a Mach-Zehnder modulator (MZM), beneficially but not necessarily using a carrier suppressed modulation. The resulting signal is then split into the two LO signals, with each LO signal including one of the sidebands. This splitting can be accomplished, e.g., using a wavelength division multiplexer (WDM) that needs to be tunable in the most general case. The two LO signals are typically phase locked according to the clock signal, and reconstruction of the single coherent baseband signal is generally performed in synchronization with the clock signal. More specifically, the multiple different baseband signals are typically digitized in synchronization, using the clock signal, so that the single coherent baseband signal can be reconstructed with proper phase alignment.

A second approach to generating the two LO signals with a discernible phase relationship is to generate the LO signals with different lasers and then measure their phase relationship. In one implementation of this approach, three lasers are used to generate three optical signals. A frequency difference between the optical signals is then measured at the same time with two analog digital converters and two photodiodes having the same bandwidth as photodiodes used to recover the different baseband signals. Compared to the first approach, the second approach avoids a need to use a tunable filter and fast modulator, but it requires two additional lasers a few couplers and two balanced or unbalanced detectors and analog to digital converters. Knowing the exact frequency difference including the phase between the two local oscillators allows reconstruction of the single coherent baseband signal in a relatively simple and direct way.

Although the following description presents several examples in which the optical signal is mixed with two different LO signals to produce baseband signals corresponding to two different portions of the baseband spectrum, the described concepts can be extended to use additional LO signals, additional baseband signals, and so on (e.g., N LO signals or baseband signals). The extension of these concepts will typically require additional IQ hybrids, PDs, data acquisition channels, and so on.

The described embodiments may allow a receiver to operate at relatively high performance without a need for fast, expensive components required by conventional approaches. For instance, some embodiments may allow a receiver to capture baseband signals with a bandwidth of 60 GHz and above without requiring ADCs and/or PDs to operate at these high bandwidths and with the corresponding high sampling rates.

The described embodiments find ready application in a variety of contexts. For example, they can be used in an optical measurement instrument to capture and analyze optical signals produced by a device under test (DUT), or they can be used in optical receivers within the ordinary field of use. Moreover, the described embodiments can be used with various encoding schemes, such as BPSK or QPSK, although they are not necessarily limited to these schemes.

Figure 1A:
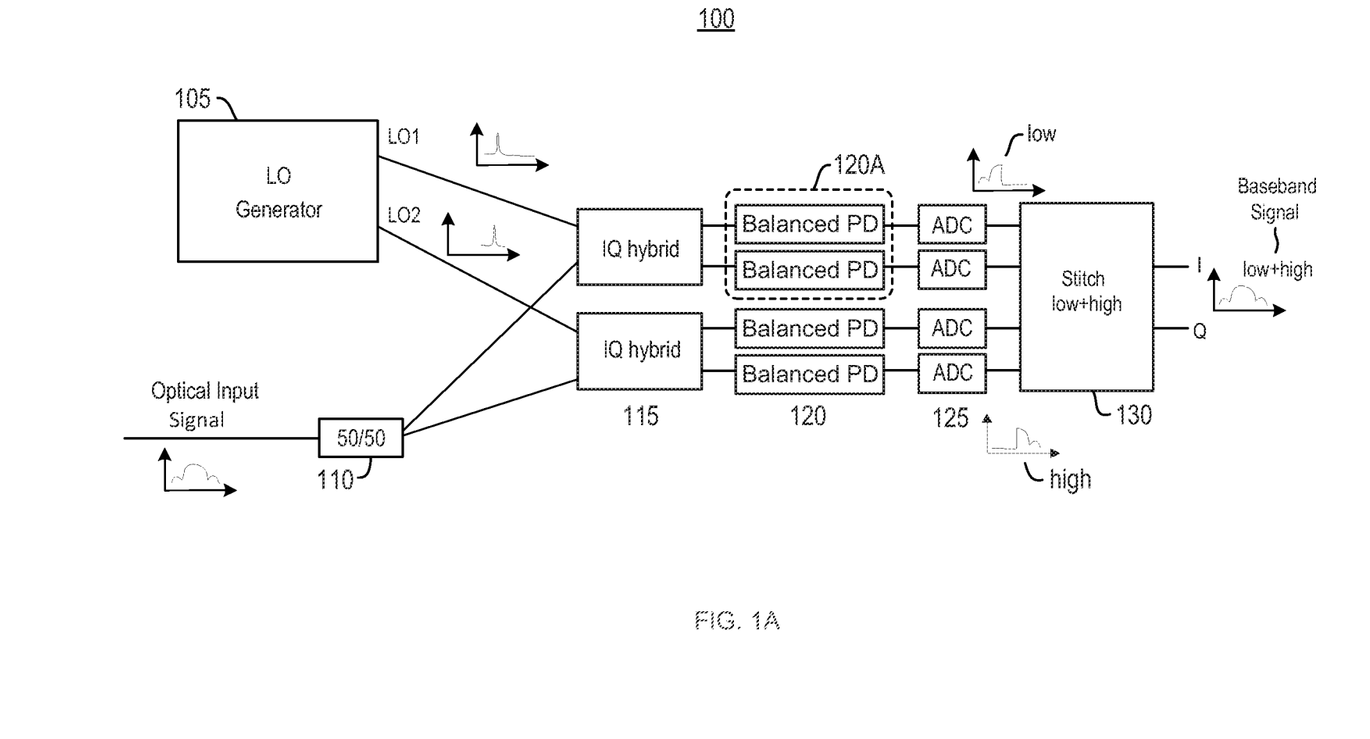
FIG. 1A is a diagram illustrating a system configured to capture an optical signal, in accordance with a representative embodiment.

FIG. 1A is a diagram illustrating a system 100 configured to capture an optical signal, in accordance with a representative embodiment. In the embodiment of FIG. 1A, two LO signals having a discernible phase relationship are mixed with an optical input signal to produce two baseband signals covering two complementary portions of the baseband spectrum. Those two baseband signals are then combined to produce a single coherent baseband signal covering both portions of the baseband spectrum. As used herein, the term "discernible phase relationship" denotes a relationship that allows the coherent baseband signal to be reconstructed with proper phase alignment. As indicated by examples shown in FIGS. 3 and 4, the discernible phase relationship is typically established or maintained by either generating the two LO signals from a single laser source and processing those signals in ways that preserve the phase relationship (FIG. 3), or by generating the LO signals with different lasers and measuring their phase relationship (FIG. 4).

Referring to FIG. 1A, system 100 comprises an LO generator 105, a power splitter 110, IQ hybrids 115, balanced PDs 120, ADCs 125, and a stitching unit 130.

During typical operation, system 100 receives an optical input signal as shown at the left side of FIG. 1A, and it produces a corresponding digital baseband signal as shown at the right side of FIG. 1A. Power splitter 110 splits the optical input signal into two signal paths each containing approximately fifty percent (50%) of the original signal power. In each of the two signal paths, one of IQ hybrids 115 combines the optical input signal with one of two LO signals generated by LO generator 105 and mixes the signals on balanced PDs 120 to produce a corresponding down-converted electrical signal. In particular, in a first path, the optical input signal is mixed with a first LO signal LO1 to produce a first down-converted electrical signal, and in a second path, the optical input signal is mixed with a second LO signal LO2 to produce a second down-converted electrical signal.

Figure 1B:
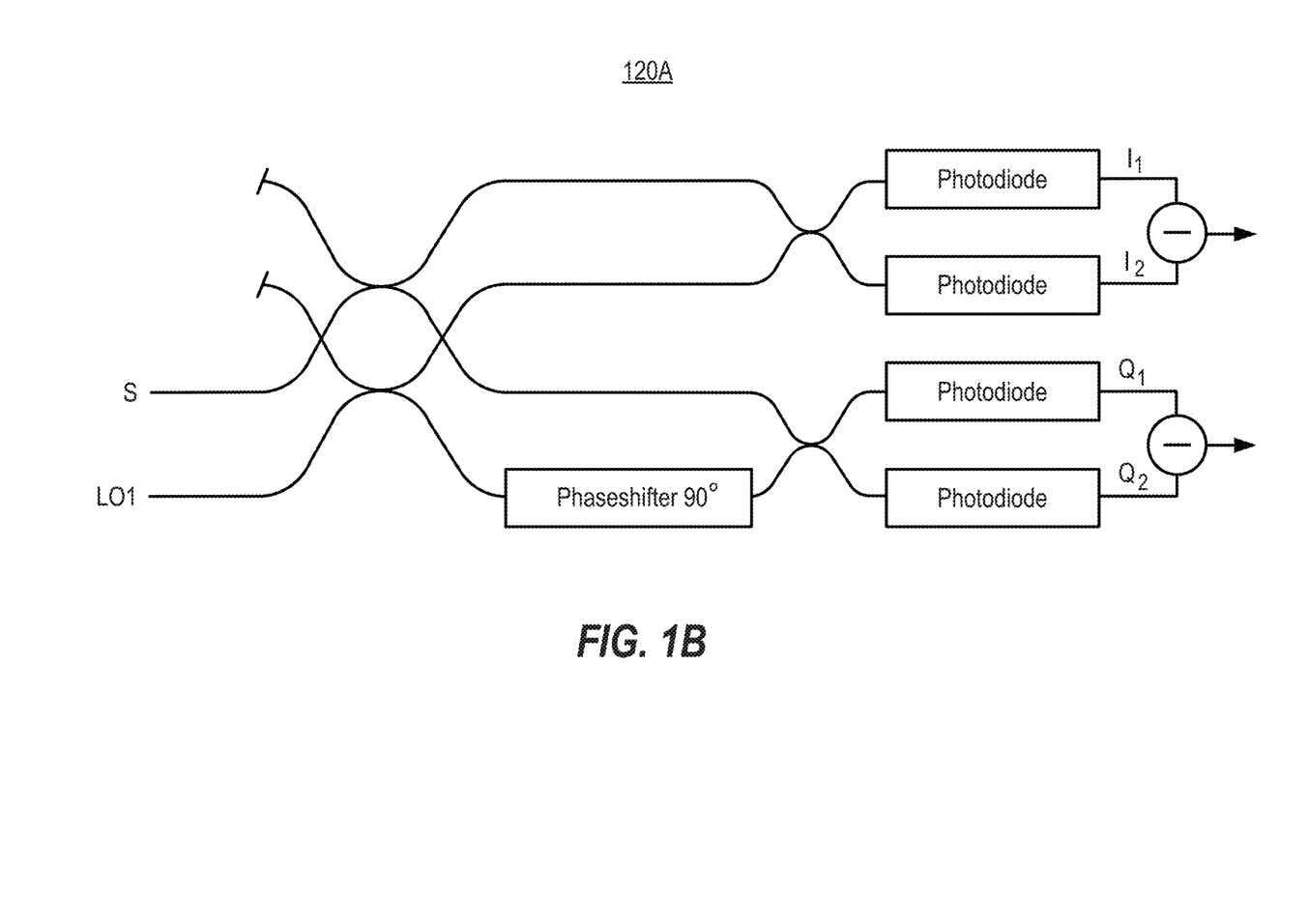
FIG. 1B is a diagram of a balanced PD in the system of FIG. 1A, in accordance with a representative embodiment.

An example of this conversion process is illustrated by FIG. 1B, which shows a pair of balanced PDs 120A configured to produce phase and quadrature data representing the first optical signal. As illustrated in FIG. 1B, each the pair of balanced PDs 120A comprises a two pairs of photodiodes each configured to convert optical power into electrical current and a phase shifting component used to generate a quadrature signal. The operation of these features in the illustrated configuration will be well understood by those skilled in the art. In alternative embodiments, balanced PDs 120 can be implemented in other forms or unbalanced photodiodes can be used.

ADCs 125 digitize the electrical signals produced by balanced PDs 120, and they output the resulting digitized signals to stitching unit 130. As illustrated by a pair of miniature graphs, the digitized signals produced by one pair of ADCs include phase and quadrature information for a lower portion of the baseband spectrum ("low"), and the digitized signals produced by the other pair of ADCs include phase and quadrature information for an upper portion of the baseband spectrum ("high").

Stitching unit 130 combines the lower and upper portions of the baseband spectrum to produce the single coherent baseband signal, illustrated by a miniature graph at the right side of FIG. 1A. The combining of the two signals can be accomplished, for instance, in a manner similar to that used to combine interleaved ADCs in order to increase their overall sampling bandwidth.

Figure 2:
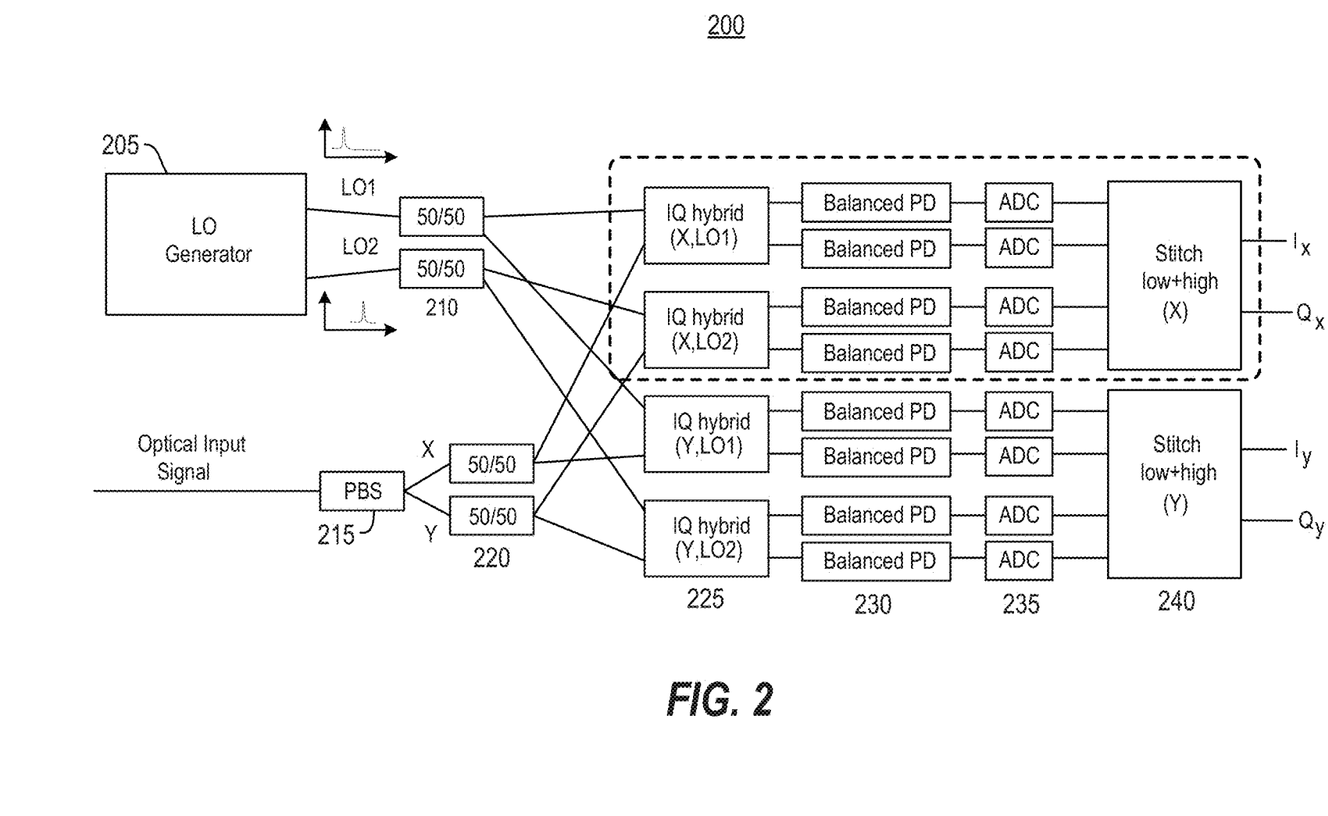
FIG. 2 is a diagram illustrating a system configured to capture an optical signal, in accordance with a representative embodiment.

FIG. 2 is a diagram illustrating a system 200 configured to capture an optical signal, in accordance with a representative embodiment. This embodiment is similar to that illustrated in FIG. 1A, except that the optical input signal is divided into two components having two different and approximately orthogonal polarization states, and those two components are processed in two separate channels. To perform this processing, system 200 comprises two substantially identical sets of components similar to those illustrated in FIG. 1A. One of these two sets of components is highlighted in FIG. 2 with a dotted box.

Referring to FIG. 2, system 200 comprises an LO generator 205, a first pair of power splitters 210, a polarization beam splitter (PBS) 215, a second pair of power splitters 220, IQ hybrids 225, balanced PDs 230, ADCs 235, and stitching units 240.

LO generator 205 functions identical to LO generator 105, generating first and second LO signals LO1 and LO2. Power splitters 210 each split the corresponding LO signal and transmit the split signal to two different IQ mixers. At the same time PBS 215 divides the optical input signal into two components corresponding to X-polarization state and a Y-polarization state, and power splitters 220 split each of the two components into two further components and transmits the further split components to two different IQ hybrids. IQ hybrids 225, balanced PDs 230, ADCs 235, and stitching units 240 function substantially the same as corresponding features described above with reference to FIG. 1A. Consequently, a first one of stitching units 240 outputs a first coherent baseband signal corresponding to the X-polarization component of the optical input signal, and a second one of stitching units 240 outputs a second coherent baseband signal corresponding to the Y-polarization component of the optical input signal.

Figure 3:
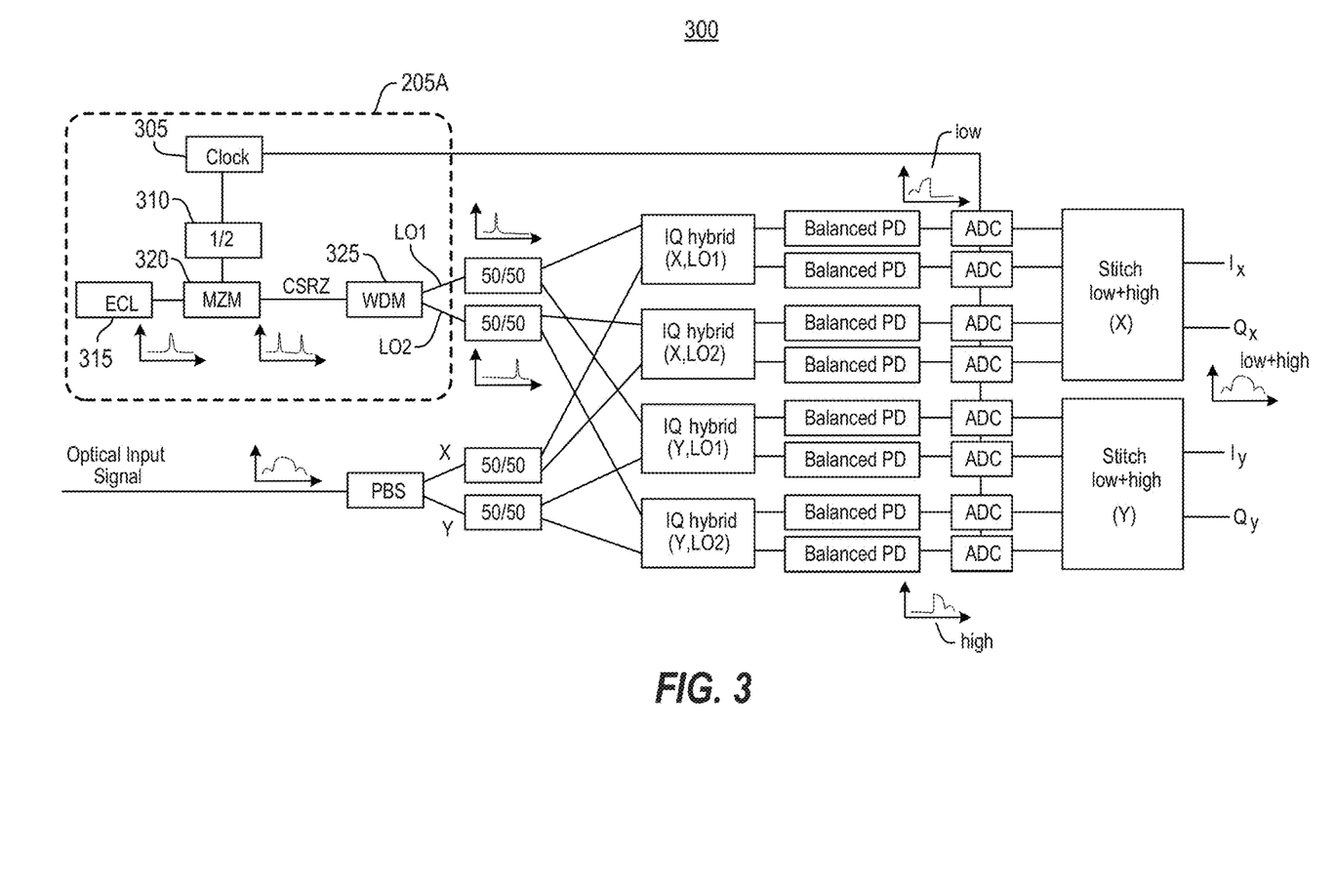
FIG. 3 is a diagram illustrating a system configured to capture an optical signal, in accordance with a representative embodiment.
Figure 4:
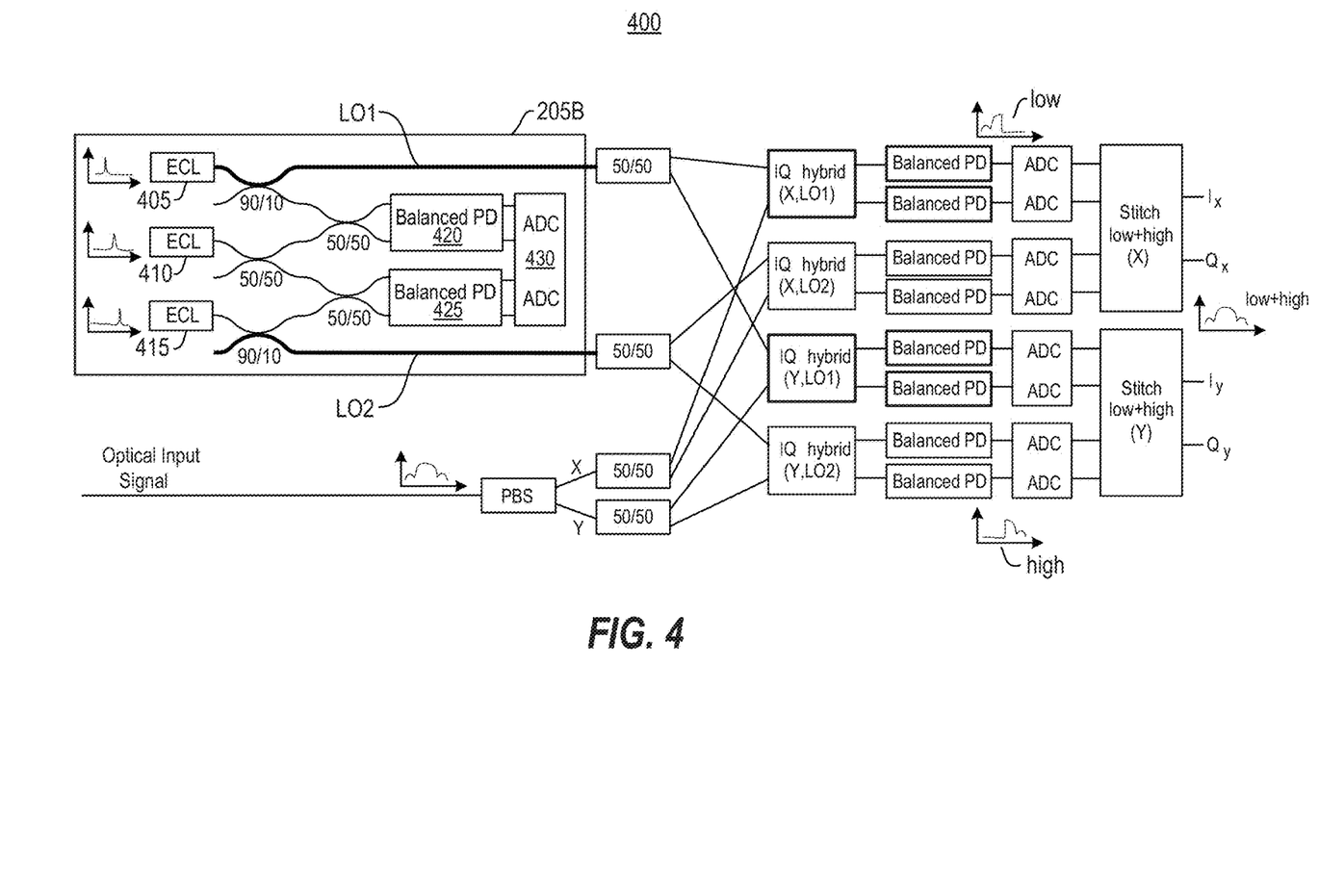
FIG. 4 is a diagram illustrating a system configured to capture an optical signal, in accordance with a representative embodiment.

FIG. 3 is a diagram illustrating a system 300 configured to capture an optical signal, in accordance with a representative embodiment. This embodiment is substantially the same as that illustrated in FIG. 2, except that an example of LO generator 205 is shown in further detail. This example will be referred to as LO generator 205A. In addition, ADCs 235 have been modified to operate in synchronization with a clock signal used to control LO generator 205A. For the sake of brevity, the description of this and other embodiments will omit details of features that have already been discussed above.

Referring to FIG. 3, LO generator 205A comprises a clock generator 305, a clock divider 310, an optical signal source 315, an optical modulator 320, and an optical de-multiplexer 325. In the illustrated example, optical signal source 315 takes the form of an ECL, optical modulator 320 takes the form of an MZM, and optical de-multiplexer 325 takes the form of a WDM. Nevertheless, these components could be varied or substituted with other components in alternative embodiments.

Optical signal source 315 is a narrow line width laser, and it generates an LO precursor signal, typically with a single carrier frequency, or a narrow frequency band. Optical modulator 320 processes the LO precursor signal to suppress the carrier frequency and produce two sidebands. In the illustrated example, the output of optical modulator 320 is an optical signal having a carrier-suppressed return to zero (CSRZ) format, and the production of this signal is governed by known operating principles of the MZM and under the control of a divided clock signal produced by clock divider 310. For example, the spacing and phase of the two sidebands can be controlled by modifying the divided clock signal.

Optical de-multiplexer 325 divides the output of optical modulator 320 into first and second LO signals LO1 and LO2, each of which includes only one of the two sidebands. As a consequence of the operating characteristics of the MZM, first and second LO signals LO1 and LO2 are phase locked, i.e., they have a known, fixed phase relationship. This known relationship allows system 300 to reconstruct the single coherent baseband signal with proper phase alignment, provided that ADCs 235 perform digitization in synchronization with the clock signal controlling optical modulator 320. Alternatively the clock signal can be generated independently and measured with an additional ADC in order to provide a measurement of the phase relationship.

FIG. 4 is a diagram illustrating a system configured to capture an optical signal, in accordance with a representative embodiment. This embodiment is also substantially the same as that illustrated in FIG. 2, except that another example of LO generator 205 is shown in further detail. This example will be referred to as LO generator 205B.

Referring to FIG. 4, LO generator 205B comprises first through third lasers 405 through 415. As illustrated by miniature graphs in FIG. 4, first laser 405 has a relatively low frequency (e.g., analogous to the sideband signal at the top of FIG. 3), third laser 415 has a relatively high frequency (e.g., analogous to the sideband signal at the bottom of FIG. 3), and second laser 410 has a frequency between the relatively low frequency and the relatively high frequency.

The respective output signals of first through third lasers 405 through 415 are divided and combined as shown in FIG. 4, i.e., approximately 90/10 division for first and third lasers 405 and 415, approximately 50/50 division for second laser 410, and so on. The combination of the output signals creates two beat frequencies indicating frequency differences between the first and second lasers, and between the second and third lasers. The combined portions of the output signals are detected by balanced or unbalanced PDs 420 and 425 and then digitized by ADCs 430.

Together, the two beat frequencies indicate the overall frequency difference between first and second LO signals LO1 and LO2. This information, in turn, can be used to reconstruct the single coherent baseband signal with proper phase alignment. Although the frequency difference between first and second LO signals LO1 and LO2 could potentially be determined by generating a single beat frequency from those two signals alone, the generation of two different beat frequencies by three lasers allows balanced or unbalanced PDs 420 and 425, as well as ADCs 430, to be implemented with lower bandwidth and sampling speeds. In other words, it avoids a need to use faster, more expensive PDs and ADCs.

Figure 5:
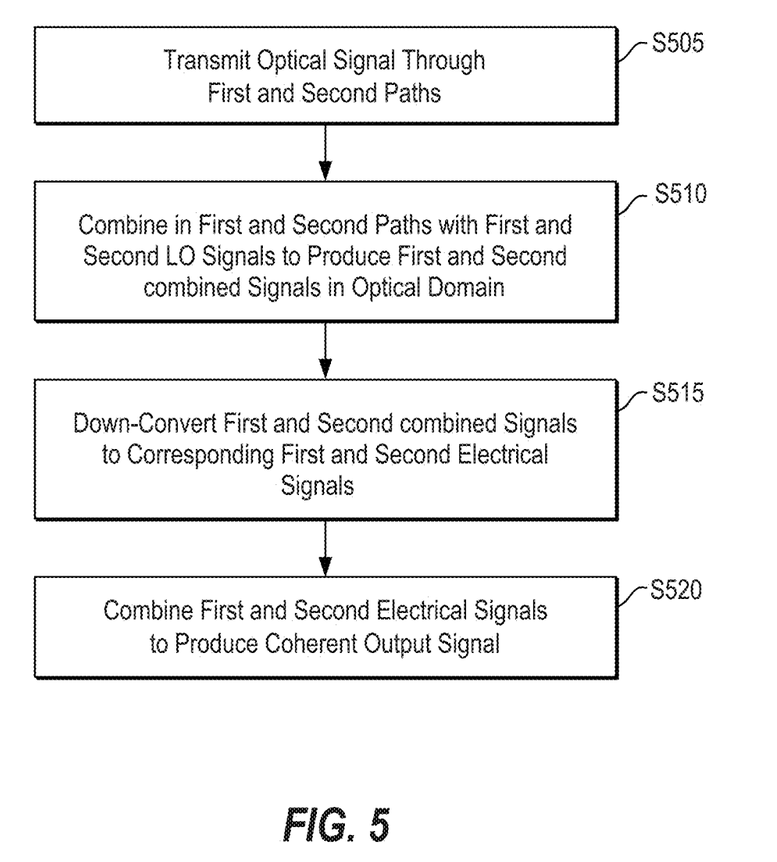
FIG. 5 is a flowchart illustrating a method of processing an optical signal, in accordance with a representative embodiment.

FIG. 5 is a flowchart illustrating a method of processing an optical signal, in accordance with a representative embodiment. The method of FIG. 5 can be used, for instance, to transform the optical input signal shown at the left side of FIG. 1A into the corresponding baseband signal shown at the right side of FIG. 1A. For convenience, the method of FIG. 5 will be explained with reference to FIG. 1A, although this and other described methods are limited to being performed by any particular system implementation. In the description that follows, example method steps will be indicated by parentheses.

Referring to FIG. 5, the method begins by transmitting an optical input signal through first and second paths (S505). This can be performed, for instance, by operation of power splitter 110. Next, the method combines the optical input signal with first and second LO signals in the respective first and second paths to produce first and second signals in the optical domain (S510). This can be performed, for instance, by operation of IQ hybrids 115. Thereafter, the method converts the first and second signals into corresponding down-converted electrical signals (S515). This can be performed, for instance, by balanced PDs 120 and ADCs 125. Finally, the method combines the first and second down-converted signals to produce a coherent output signal (S520). This can be performed, for instance, by stitching unit 130.

As will be appreciated from the description of systems 100 through 400, various intermediate and/or additional operations may be performed in combination with those illustrated in FIG. 5. For instance, clocking and/or synchronization and additional calibration operations may be performed to ensure that the electrical signals are properly digitized by ADCs 125, as illustrated in FIG. 3. Similarly, measurement of the first and second LO signals may be performed to ensure proper phase alignment, as illustrated in FIG. 4. Moreover, the operations of FIG. 5 may be performed concurrently on different polarization components, as in the examples of FIGS. 2 through 4. Beam splitting and additional power splitting may be performed to facilitate such additional operations, as will be apparent from the description of FIGS. 2 through 4.

Figure 6:
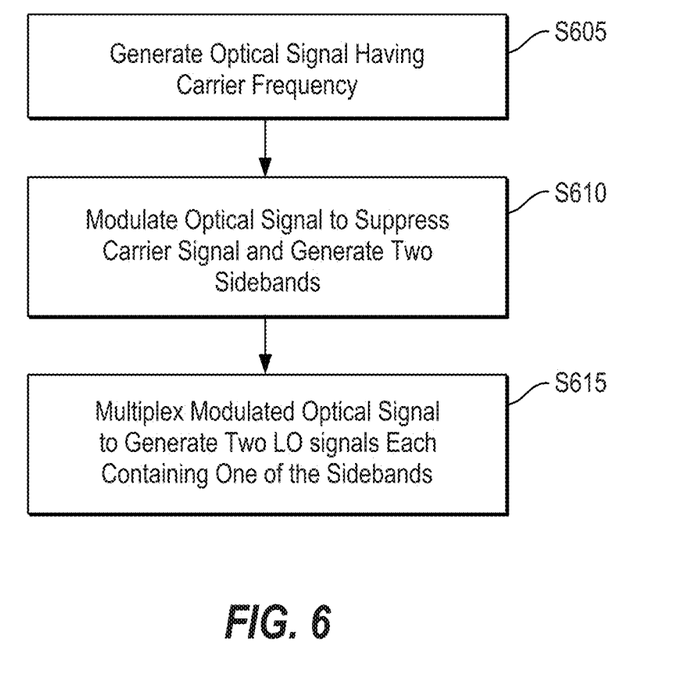
FIG. 6 is a flowchart illustrating a method of generating two local oscillator (LO) signals for the method of FIG. 5, in accordance with a representative embodiment.

FIG. 6 is a flowchart illustrating a method of generating two LO signals for the method of FIG. 5, in accordance with a representative embodiment. The method of FIG. 6 can be used in the context of system 300, for instance, and will be described with reference to that system. Nevertheless, the method is not restricted to system 300.

Referring to FIG. 6, the method generates an optical signal having a carrier frequency (S605). This can be performed by optical signal source 315, for instance. Next, the optical signal is modulated to suppress the carrier frequency and generate two sidebands (S610). This can be performed by optical modulator 320, for instance. Carrier suppression in that context is not mandatory but tends to improve the signal in the both sidebands, also it relaxes the requirements for splitting the signal into the two sidebands. Thereafter, the modulated optical signal is de-multiplexed to generate the two LO signals, each including one of the sidebands (S615). This can be accomplished by optical de-multiplexer 325, for instance.

As explained with reference to FIG. 3, optical modulator 320 operates under control of a clock signal, which can be used to adjust the properties of the sidebands, such as their phase and spacing. In addition, the clock can be used to control synchronization of digitization. These and other additional operations described with reference to FIG. 3 can be performed in conjunction with the operations illustrated in FIG. 6.

Figure 7:
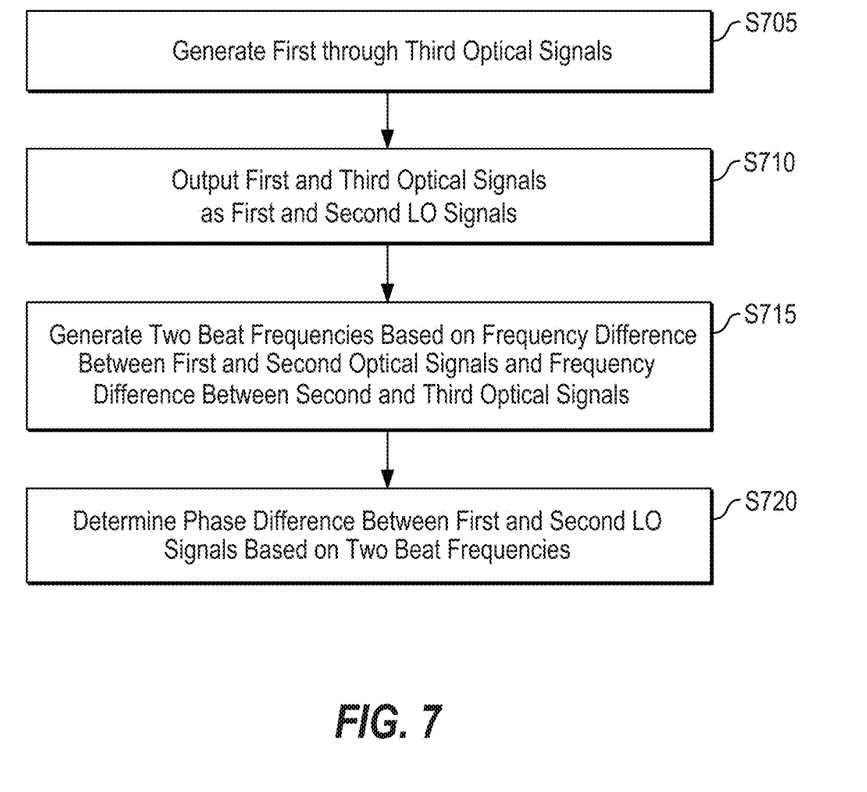
FIG. 7 is a flowchart illustrating a method of generating two LO signals for the method of FIG. 5, in accordance with another representative embodiment.

FIG. 7 is a flowchart illustrating a method of generating two LO signals for the method of FIG. 5, in accordance with another representative embodiment. The method of FIG. 7 can be used in the context of system 400, for instance, and will be described with reference to that system. Nevertheless, the method is not restricted to system 400.

Referring to FIG. 7, the method generates first through third optical signals (S705). This can be performed by first through third lasers 405 through 415, for example. The first and third optical signals are output as first and second LO signals (S710). For example, as shown in FIG. 4, the majority of the power in each of the first and third optical signals can be output as LO signals. Next, two beat frequencies are generated based on a first frequency difference between the first and second optical signals and a second frequency difference between second and third optical signals (S715). These beat frequencies can be generated, for instance, by balanced or unbalanced PDs 420 and 425 and ADCs 430. Finally, the two beat frequencies can be used to determine an overall phase difference between the first and third optical signals, i.e., the two LO signals (S720). As indicated above, the determination of the phase difference can be used to ensure proper reconstruction of two portions of the baseband signal in system 400, for example.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A system configured to process an optical input signal, comprising:
    first and second signal paths configured to receive the optical input signal;
    an LO generator, comprising: a laser configured to generate an LO precursor signal having a carrier frequency; an optical modulator configured to modulate the LO precursor signal by carrier suppressed modulation to suppress the carrier frequency and generate at least two sidebands carrier suppressed modulation carrier suppressed modulation; and an optical de-multiplexer configured to de-multiplex the modulated LO precursor signal to generate the first and second LO signals;
    first and second phase-quadrature (IQ) hybrids disposed in the respective first and second signal paths and configured to combine the optical input signal with respective first and second local oscillator (LO) signals to produce first and second signals, the first and second LO signals having a discernible phase relationship;
    first and second photodetectors (PDs) configured to convert the first and second signals into corresponding first and second down-converted electrical signals corresponding to different portions of a frequency spectrum of the optical input signal, respectively;
    a plurality of analog to digital converters configured to digitize the first and second down-converted electrical signals; and
    a stitching unit configured to combine the first and second digitized electrical signals to produce a coherent time-domain output signal.

2. The system of claim 1, further comprising:
    third and fourth signal paths;
    a polarization beam splitting unit configured to split the optical input signal into first and second polarization components, to transmit the first polarization component through the first and second signal paths, and to transmit the second polarization component through the third and fourth signal paths, wherein the first polarization component is combined with the first and second LO signals in the first and second IQ hybrids to produce the first and second signals, and wherein the coherent time-domain output signal corresponds to the first polarization component;
    third and fourth IQ hybrids disposed in the respective third and fourth signal paths and configured to combine the second polarization component with respective first and second LO signals to produce third and fourth signals;
    third and fourth PDs configured to convert the third and fourth signals into corresponding third and fourth down-converted electrical signals corresponding to different portions of the frequency spectrum of the optical input signal, respectively;
    an additional plurality of analog to digital converters configured to digitize the third and fourth down-converted electrical signals; and
    an additional stitching unit configured to combine the third and fourth digitized electrical signals to produce an additional coherent time-domain output signal corresponding to the second polarization component.

3. The system of claim 1, wherein each of the first and second down-converted electrical signals comprises a phase component and a quadrature component.

4. The system of claim 2, wherein the first and third down-converted electrical signals comprise a phase component and the second and fourth down-converted electrical signals comprise a quadrature component.

5. An optical measurement instrument comprising the system of claim 1.

6. An optical receiver comprising the system of claim 1.

7. The system of claim 1, further comprising an LO generator, comprising:
    first through third lasers configured to generate respective first through third optical signals having respective first through third carrier frequencies, the first and third optical signals corresponding to the first and second LO signals; and
    a plurality of photodetectors and analog to digital converters configured to determine a first beat frequency corresponding to a difference between the first and second carrier frequencies, and a second beat frequency corresponding to a difference between the second and third carrier frequencies.

8. The system of claim 1, wherein the optical input signal is generated using amplitude and phase modulation.

9. The system of claim 1, further comprising:
an optical one by N splitter configured to generate N signals from the optical input signal;
N IQ hybrids disposed in N signal paths and configured to combine the optical input signal with N LO signals, respectively, to produce N signals;
N PDs configured to convert the N signals into corresponding N down-converted electrical signals corresponding to different portions of the frequency spectrum of the optical signal, respectively; and
N analog to digital converters configured to digitize the N down-converted electrical signals;
wherein the stitching unit is further configured to combine the digitized N down-converted signals to produce the coherent time-domain output signal.

10. The system of claim 1, wherein the optical modulator is controlled by a clock signal.

11. The system of claim 1, wherein the optical modulator is a Mach-Zehnder modulator (MZM).

* * * * *